United States Patent [19]

Myers

[11] Patent Number: 5,187,467
[45] Date of Patent: Feb. 16, 1993

[54] UNIVERSAL LIGHT PEN SYSTEM
[75] Inventor: Robert L. Myers, Loveland, Colo.
[73] Assignee: Hewlett Packard Company, Palo Alto, Calif.
[21] Appl. No.: 639,607
[22] Filed: Jan. 10, 1991
[51] Int. Cl.[5] .............................................. G09G 3/02
[52] U.S. Cl. ..................................... 340/707; 340/706
[58] Field of Search ............... 340/707, 708, 814, 712, 340/706

[56] References Cited
U.S. PATENT DOCUMENTS
3,793,481 2/1974 Ripley et al. .......................... 340/707
4,367,465 1/1983 Mati et al. ............................ 340/707
4,677,428 6/1987 Bartholow ........................... 340/708

Primary Examiner—Jeffrey A. Brier
Assistant Examiner—A. Au

[57] ABSTRACT

A light pen system in accordance with the present invention comprises (a) detecting means for detecting horizontal and vertical sync signals for controlling a raster-scan display; (b) line counter means, coupled to the detecting means and responsive to the horizontal sync signals, for providing a line count corresponding to the vertical position of the beam; and (c) pixel counter means, coupled to the detecting means, for providing a pixel count corresponding to the horizontal position of the beam.

31 Claims, 2 Drawing Sheets

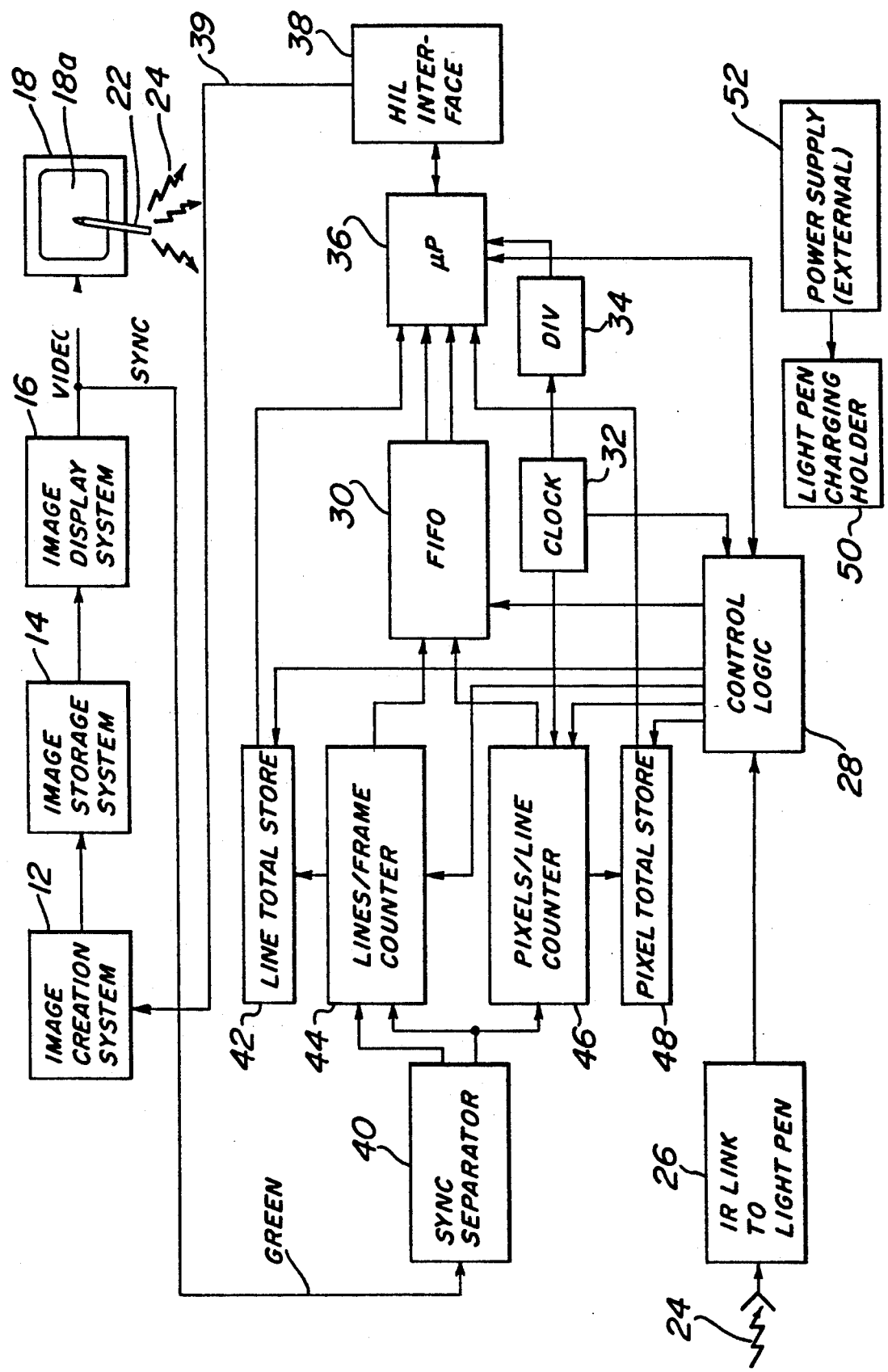

UNIVERSAL LIGHT PEN SYSTEM

FIELD OF THE INVENTION

The present invention relates generally to light pens for interacting with computer-based systems employing a raster-scan display. More particularly, the present invention relates to light pen systems for selecting particular locations on a raster-scan display screen in an interactive computer graphics system.

BACKGROUND OF THE INVENTION

The field of computer graphics concerns the creation, storage, manipulation and display of pictures and models of objects by a digital processor. Interactive computer graphics is the subclass of computer graphics in which a user dynamically controls the picture's content, format, size or color on a display surface by means of an interaction device such as a keyboard, lever, joystick, mouse or light pen. The creation of synthetic images (i.e., images which exist as abstract collections of lines, usual domain of interactive computer graphics. This is in contrast to the creation of images of real objects, which come directly or indirectly from a scanning device of some sort, e.g., a film scanner, TV scanner, ultrasound scanner, etc.

There are two primary classes of interactive computer graphics systems: random-scan and raster-scan systems. Images displayed by a random-scan system are encoded as commands to draw each output primitive (i.e., point, line or polygon) by plotting individual points or drawing connecting lines between specified starting and ending coordinates of line segments. Polygons are simply treated as a closed series of line segments. Encoding for a raster-scan system is much simpler: output primitives are broken up into their constituent points for display. The major difference between a simple point-plotting random-scan system and a raster-scan system is in the organization of the stored data used to drive the display. (As explained below, the data is stored in a frame buffer or refresh buffer.) In the random-scan display system, the component points of each successive output primitive are stored sequentially in memory and are plotted in that order, one point at a time. This is because the beam may be moved randomly on the screen. In the raster-scan display system, the refresh memory is arranged as a 2-dimensional array of data. The entry or value stored at a particular row and column encodes an intensity and/or color value of a corresponding display element on the screen. By convention, the location of each display element is specified by a unique (X,Y) coordinate.

Since each memory location defines a single point-sized element of an image, both the display screen location and its corresponding memory location are often called a "pixel," short for the image processing term "picture element." Hereinafter, to avoid confusion, the term "display pixel" is used to indicate picture elements of a display device, and "storage pixel" to indicate memory locations corresponding to the display pixels.

FIG. 1 is a simplified block diagram of a typical raster-scan graphic system. Such a system includes an image creation system 12, an image storage system 14 (such as a refresh buffer or frame buffer), an image display system 16, a raster display 18 and an interaction device 20. The image creation system 12 converts output primitives into the data stored in the refresh buffer or frame buffer of the image storage system 14. See *Fundamentals of Interactive Computer Graphics*, by J. D. Foley and A. Van Dam, ISBN: 0-201-14468-9.

Image display system 16 cycles through frame buffer 14 row by row (i.e., scan line by scan line), typically 30 or 60 times per second, and ouputs video signals to raster display 18 for controlling the CRT beam's deflection and intensity. The data stored in the frame buffer is used to control the beam's intensity, while the beam's deflection is controlled by horizontal and vertical sync signals generated within image display system 16. At the start of a refresh cycle, or "frame", an X address register in image display system 16 is set to zero and a Y address register is set to a number $N-1$ corresponding to the top scan line. As the first scan line is processed, the X address is incremented up through the number of pixels per scan line. Each pixel value is read from the frame buffer and used to control the intensity of the CRT beam. After the first scan line is processed, the X address is reset to zero and the Y address is decremented by one. The process is continued until the last scan line (corresponding to $Y=0$) is processed.

The user of a graphics system interacts with the application program through an interaction device 20, such as, e.g., a light pen. Light pens are pixel-indicating or "picking" devices; i.e., they are used to select one or more optional input commands made available and displayed by the application program. The light pen detects light emitted from a particular display pixel during the short period the CRT beam is actually exciting that pixel. It is not sensitive to the more prolonged phosphorescence or to ambient room light. The application program may be designed to halt the raster-scan or otherwise alter its which the beam was detected. See *Fundamentals of Interactive Computer Graphics*, pp. 128–129, 192–194, referenced above.

A disadvantage of the heretofore known light pen systems is that they are highly dependent upon the specific graphics system in which they are employed. For example, a dedicated circuit typically must be provided within the image display system to trap the frame buffer address at which the beam is detected. In addition, the link between the pen and the graphics system is typically a cable connecting the pen directly to the image display system. This creates an unwieldy situation as the user is forced to drag the cable around his or her work area, often interfering with other devices, papers, beverages, etc., in the area.

SUMMARY OF THE INVENTION

Accordingly, an object of the present invention is to provide a light pen system that is adaptable to a variety of computer-based systems, including a variety of computer graphics systems. A further object of the present invention is to provide a light pen system that can be used with a computer graphics system without having access to the graphics system's frame buffer addresses. A still further object of the present invention is to provide a light pen system that does not require a cable to connect the light pen to the rest of the system. The present invention achieves these goals.

According to the invention, a light pen system for identifying (or picking) a particular location on the screen of a raster-scan display comprises means for detecting first and second sync signals to the raster-scan display, means responsive to the first sync signal for providing a line count indicative of a first (e.g., vertical) component of an identified location on the screen, and means for providing a pixel clock count indicative of a second (e.g., horizontal) component of the identified location on the screen.

A preferred embodiment of the invention further comprises a clock coupled to the pixel counter for providing a clock signal upon which the pixel clock count is based. In addition the preferred embodiment further comprises a light pen for detecting the CRT beam at a particular screen location and providing a light pen signal indicative thereof, control means responsive to the light pen signal for controlling output and storage of the line and pixel clock counts, and a link for coupling the light pen signal to the control means.

A most preferred embodiment of the present invention comprises, in addition to the above, means for resetting the line count upon detection of a vertical sync pulse and resetting the pixel clock count upon detection of a horizontal sync pulse. The most preferred embodiment further includes means for storing a total pixel clock count, means for storing a total line count, means for storing line and pixel clock counts output by the line and pixel counters in response to a signal from the control means, and a processor for computing the screen location at which the beam is detected by the light pen. The screen location is computed as a function of the line count, pixel clock count, total line count and total pixel count. Finally, in the most preferred embodiment the light pen system employs an IR link between the light pen and the computer-based system with which it is used.

In another embodiment, the present invention provides a computer graphics system comprising an image creation system, a frame buffer, a raster-scan display having a plurality of display pixels each of which has a vertical coordinate that may be defined by a line count and a horizontal coordinate that may be defined by a pixel count, means for providing video image data and horizontal and vertical sync signal to the raster-scan display, and a light pen system as described above.

BRIEF DESCRIPTION OF THE DRAWINGS

FIG. 2 is a block diagram of a light pen system in accordance with the present invention for interacting with a computer graphics system of the type shown in Fig. 1.

DETAILED DESCRIPTION OF THE PREFERRED EMBODIMENT

Figure 1:
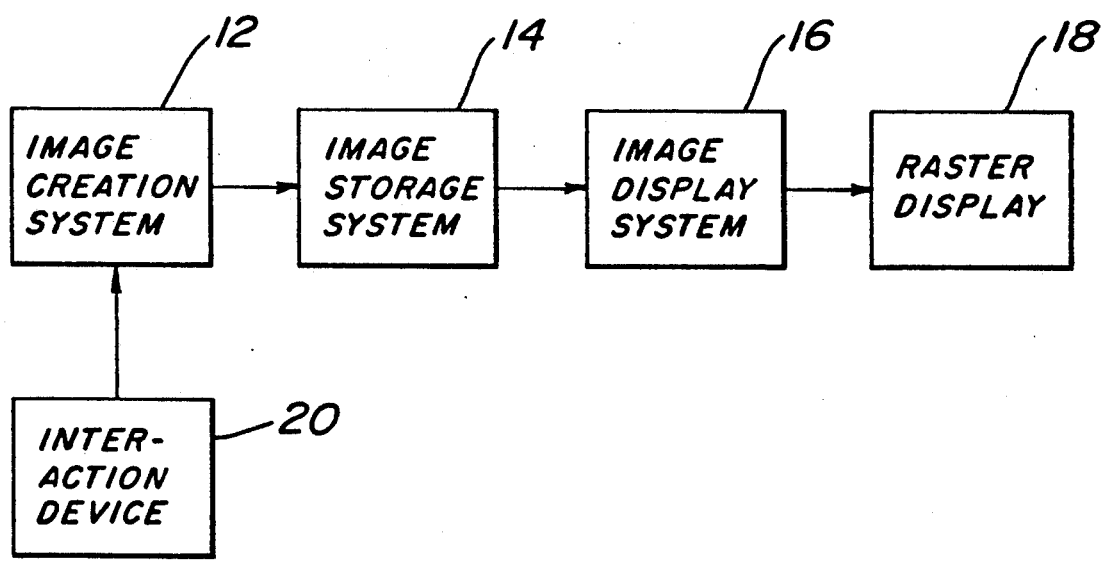
FIG. 1 is a simplified block diagram of a known interactive computer graphics system.

Referring now to FIG. 2, a preferred embodiment of the present invention provides a light pen system for interacting with a raster-scan computer graphics system, such as the system described above. In particular, the inventive light pen system provides a means for identifying particular areas on the screen 18a of the raster-scan display 18. According to the invention, such a light pen system includes a light pen 22 coupled via, e.g., an IR link 24, 26 to a control logic circuit 28. The control logic circuit 28, in conjunction with a microprocessor 36, controls the operation of certain counters and registers (described below) to determine the precise location on the display screen 18a that the CRT beam was detected by the light pen. This operation is described below.

In the preferred embodiment, microprocessor 36 computes an (X,Y) location on the display screen in terms of a line count for Y (the vertical dimension) and a pixel count for X (the horizontal dimension). While the pen 22 is held to the display screen 18a, an electron beam (not shown) scans the back-side of the screen 18a, lighting up display pixels in accordance with information stored in the image storage system or frame buffer 14. Data from the frame buffer, however, is first transformed into a video signal (denoted "VIDEO" in the drawing) by the image display system 16. The video signal contains a sync signal ("SYNC") that controls horizontal and vertical synchronization of the display. For example, many high resolution displays employ a composite "sync-on-green" in which both horizontal and vertical sync signals are transmitted over the green channel. According to the invention, the horizontal and vertical sync signals may be used to determine the location at which the beam was detected.

A sync separator circuit 40 separates the horizontal and vertical sync signals from SYNC, and provides signals corresponding not to the actual sync signals but instead to the horizontal and vertical blanking intervals. The period during which the beam is moved from the end of one scan line to the beginning of the following scan line is defined by a horizontal blanking pulse, and the period during which the beam is moved from the lower right portion of the screen to the upper left portion of the screen is defined by a vertical blanking pulse. These blanking pulses may be obtained directly from the sync signals, as a monitor does, or the circuit 40 may be programmed to "know" the expected blanking intervals for the various resolutions. It should be noted, however, that the latter method is less desirable, as it makes the light pen system more dependent upon the characteristics of the particular graphics system with which it is used.

At system power up, processor 36 determines the display screen's height (in terms of scan lines) and width (in terms of clock pulses) by counting the number of horizontal blanking pulses between each vertical blanking pulse and the number of internal clock pulses, generated by an internal clock 32, between each horizontal blanking pulse. Use of an internal clock signal is required because the light pen system does not have access to the graphics system's clock. This will work well as long as the internal clock is fast enough to provide a sufficient number of pulses per horizontal scan line. The horizontal blanking pulses count and internal clock pulses count are stored in registers 42, 48, respectively. The horizontal blanking pulses count corresponds to the total number of scan lines on the display screen 18a, and the internal clock pulses count is proportional to the total number of display pixels per scan line.

Once the line and pixel total counts are stored, the line and pixel counters 44, 46 are kept running. The light pen system is thereby able to determine the pen's 22 position on the screen 18a by noting the counts at the instant the beam is detected and comparing these counts to the stored total counts.

The actual chain of events would be as follows. A pen enable button (not shown) is pressed by the user, whereupon the current line and pixel counts are stored into a small, fast FIFO register 30. A count is also maintained to keep track of the total number of light pulses received by the pen 22 (corresponding to detection of the beam) during this frame. During the vertical blanking interval, the captured counts are passed to processor 36, and the line and pixel counters 44, 46 reset. Processor 36 then determines if a valid capture has been made, and, if so, the location of the point selected, i.e, the light pen's location on the display screen 18a. Too many stored points indicate an error has been made; e.g., the pen may have been too far from the screen, and thus "saw" too large an area. If an error occurred, the entry is simply ignored. If the entry is deemed valid, processor 36 determines the intended point from the ratio of the counts supplied to their respective stored maximum values, translates that information into the proper format, and passes the information to an interface 38 to the image creation system 12. This processing is preferably performed during the next frame after the counts were actually received, with the capture of the next point proceeding in parallel. In a most preferred embodiment, interface 38 is an HIL (HP Interface Loop) interface. Note also that clock 32 may be coupled to processor 36 via a divider 34, whereby the frequency of the clock signal may be adjusted in accordance with the required clock frequency of processor 36.

The IR link comprises an IR LED (not shown) for emitting infrared light signals 24, and an IR receiver in receiver box 26. The IR LED is attached to an end of light pen 22. The light pen itself contains the lenses (not shown) and phototransistor (not shown) needed to sense the CRT's beam, a simple driver (not shown) for the IR LED, and a rechargeable battery, preferably a small Ni-Cad battery (not shown). Receiver box 26, which is preferably designed to mount on the top of the display 18, preferably provides a holder 50 (with charging contacts) for pen 22, and additional holders (not shown) for HIL interface 38, counters 44, 46, sync separator 40, clock 32, and processor 36. It may be possible to use a modification of the standard small HIL enclosure. As the complete interface will likely require more current than is normally expected of an HIL device (in addition to the current required to charge the battery in the pen), it may be necessary to supply additional power to the charging holder 50 from an external power source 52 such as, e.g., a small "AC adaptor" type of supply.

Many modifications and variations of the above-described embodiment will be apparent to those skilled in the art. For example, the scope of the invention is not confined to systems employing an IR link between the light pen 22 and control logic 28. Nor is the invention limited to systems employing sync-on-green synchronization (although this is preferred), or to systems employing the HIL interface 38 for interfacing to the image creation system 12. Nor, in fact, is the invention limited to light pen systems used in combination with a computer graphics system, as the system described above may be employed in other applications, e.g., to control the cursor of a personal computer (provided of course that horizontal and vertical sync signals are accessible). Accordingly, the invention is intended to be limited only by the following claims.

What is claimed is:

1. A light pen system for identifying a screen location on a raster-scan display, the screen location having a first component definable by a line count and a second component definable by a pixel count, the vertical and horizontal dimensions of the display screen definable by a prescribed number of scan lines and a prescribed number of pixels per scan line, comprising:
   (a) detecting means for detecting first and second sync signals to the raster-scan display;
   (b) line counter means, coupled to said detecting means and responsive to said first sync signal, for providing a line count indicative of the first component, said line counter means including first storage means for determining and storing a total line count indicative of said prescribed number of scan lines; and
   (c) pixel counter means, coupled to said detecting means, for providing a pixel-clock count representative of the second component, said pixel counter means including second storage means for determining and storing a total pixel-clock count representative of said prescribed number of pixels per scan line.

2. The light pen system recited in claim 1, further comprising:
   (d) clock means coupled to said pixel counter means for providing a clock signal upon which said pixel-clock count and total pixel-clock count are based.

3. The light pen system recited in claim 2, further comprising:
   (e) light pen means for detecting a beam of the display at a particular screen location and providing a light pen signal indicative thereof;
   (f) control means, coupled to said line counter means and pixel counter means and responsive to said light pen signal, for controlling the output of said line and pixel-clock counts upon the reception of said light pen signal; and
   (g) link means for coupling said light pen signal to said control means.

4. The light pen system recited in claim 3, wherein said first sync signal is a horizontal sync signal, said first component is a vertical component, said second sync signal is a vertical sync signal and said second component is a horizontal component.

5. The light pen system recited in claim 4, further comprising reset means for resetting said line count upon detection of a vertical sync pulse, and resetting said pixel-clock count upon detection of a horizontal sync pulse.

6. The light pen system recited in claim 5, further comprising third storage means, coupled to said line counter means and said pixel counter means, for storing line and pixel-clock counts output by said line counter and pixel counter means, respectively, in response to a signal from said control means.

7. The light pen system recited in claim 6, further comprising processor means, coupled to said first, second and third storage means, for computing the screen location at which the beam is detected by said light pen means, said screen location computed as a function of said line count, pixel-clock count, total line count and total pixel-clock count.

8. The light pen system recited in claim 7, wherein said detecting means comprises means for separating a sync signal into horizontal and vertical sync signals.

9. The light pen system recited in claim 3, wherein said link means is an infra red link.

10. The light pen system recited in claim 7, wherein said link means is an infra red link.

11. The light pen system recited in claim 1, wherein said detecting means comprises means for separating a sync signal into horizontal and vertical sync signals.

12. A computer graphics system, comprising:
   (a) image creation means for generating image data to be displayed;
   (b) frame buffer means coupled to said image creation means for storing image data;
   (c) a raster-scan display comprising display pixels and a beam for activating said display pixels, each pixel having a vertical location definable by a line count and a horizontal location definable by a pixel count, the vertical and horizontal dimensions of the display definable by a prescribed number of scan lines and a prescribed number of pixels per scan line;

(d) means, coupled between said frame buffer means and said raster-scan display, for providing video image data and a sync signal to said raster-scan display; and (e) a light pen system for identifying a screen location on said raster-scan display, said light pen system comprising: (i) detecting means for detecting horizontal and vertical sync signals to the raster-scan display; (ii) line counter means, coupled to said detecting means and responsive to said horizontal sync signal, for providing a line count indicative of a vertical position on the screen, said line counter means including first storage means for determining and storing a total line count indicative of said prescribed number of scan lines; and (iii) pixel counter means, coupled to said detecting means, for providing a pixel-clock count representative of a horizontal location on the screen, said pixel counter means including second storage means for determining and storing a total pixel-clock count representative of said prescribed number of pixels per scan line.

13. The computer graphics system recited in claim 12, further comprising clock means coupled to said pixel counter means for providing a clock signal upon which said pixel-clock count is based.

14. The computer graphics system recited in claim 13, further comprising light pen means for detecting a beam of the display at a particular screen location and providing a light pen signal indicative thereof; control means, coupled to said line counter means and pixel counter means and responsive to said light pen signal, for controlling the output of said line and pixel-clock counts; and link means for coupling said light pen signal to said control means.

15. The computer graphics system recited in claim 14, further comprising reset means for resetting said line count upon detection of a vertical sync pulse, and resetting said pixel-clock count upon detection of a horizontal sync pulse.

16. The computer graphics system recited in claim 15, further comprising third storage means, coupled to said line counter means and said pixel counter means, for storing line and pixel-clock counts output by said line counter and pixel counter means, respectively, in response to a signal from said control means.

17. The computer graphics system recited in claim 16, further comprising processor means, coupled to said first, second and third storage means, for computing the screen location at which the beam is detected by said light pen means, said screen location computed as a function of said line count, pixel-clock count, total line count and total pixel-clock count.

18. The computer graphics system recited in claim 17, wherein said link means is an infra red link.

19. The computer graphics system recited in claim 18, wherein said detecting means comprises means for separating a sync signal into horizontal and vertical sync signals.

20. The computer graphics system recited in claim 12, wherein said link means is an infra red link.

21. The computer graphics system recited in claim 12, wherein said detecting means comprises means for separating a sync signal into horizontal and vertical sync signals.

22. A method for identifying a screen location on a raster-scan display, the screen location having a first component definable by a line count and a second component definable by a pixel-clock count, the vertical and horizontal dimensions of the display definable by a prescribed number of scan lines and a prescribed number of pixels per scan line, the method comprising the steps of:

(a) detecting first and second sync signals to the raster-scan display;

(b) determining and storing a total line count indicative of said prescribed number of scan lines and determining and storing a total pixel-clock count representative of said prescribed number of pixels per scan line;

(c) determining a line count in accordance with said first sync signal and said total line count, said line count being indicative of said first component; and (d) determining a pixel-clock count, on the basis of at least said total pixel-clock count, representative of said second component.

23. The method recited in claim 22, wherein said pixel-clock count is further based upon a clock signal.

24. The method recited in claim 23, further comprising:

(d) detecting a beam of the display at a particular screen location and providing a light pen signal indicative thereof; and (e) outputting said line and pixel-clock counts upon the reception of said light pen signal.

25. The method recited in claim 24, wherein said first sync signal is a horizontal sync signal, said first component is a vertical component, said second sync signal is a vertical sync signal and said second component is a horizontal component.

26. The method recited in claim 25, further comprising the steps of resetting said line count upon detection of a vertical sync pulse, and resetting said pixel-clock count upon detection of a horizontal sync pulse.

27. The method recited in claim 26, further comprising the step of storing said line and pixel-clock counts in response to said light pen signal.

28. The method recited in claim 27, further comprising the step of computing the screen location at which the beam is detected, said screen location computed as a function of said line count, pixel-clock count, total line count and total pixel-clock count.

29. The method recited in claim 28, further comprising the step of separating a composite sync signal into horizontal and vertical sync signals.

30. A method for determining horizontal and vertical components of a selected location on a screen of a raster-scan display, the vertical and horizontal dimensions of the display definable by a prescribed number of scan lines and a prescribed number of pixels per scan line, the method comprising the steps of:

(a) detecting horizontal and vertical sync signals to the raster-scan display, said horizontal sync signal containing horizontal sync pulses and said vertical sync signal containing at least one vertical sync pulse;

(b) determining and storing a total line count indicative of said prescribed number of scan lines and determining and storing a total pixel-clock count representative of said prescribed number of pixels per scan line;

(c) counting said horizontal sync pulses and providing a line count indicative thereof;

(d) counting clock pulses and providing a pixel-clock count representative thereof;

(e) detecting the selection of a location on the screen; and (f) computing said horizontal component based at least upon the ratio of the pixel-clock count at the time of the selection to said total pixel-clock count, and computing said vertical component based at least upon the ratio of the line count at the time of the selection to said total line count.

31. The method recited in claim 30, further comprising the steps of resetting the line count in response to the vertical sync pulse and resetting the pixel-clock count in response to the horizontal sync pulses.

* * * * *